United States Patent Office 2,709,656
Patented May 31, 1955

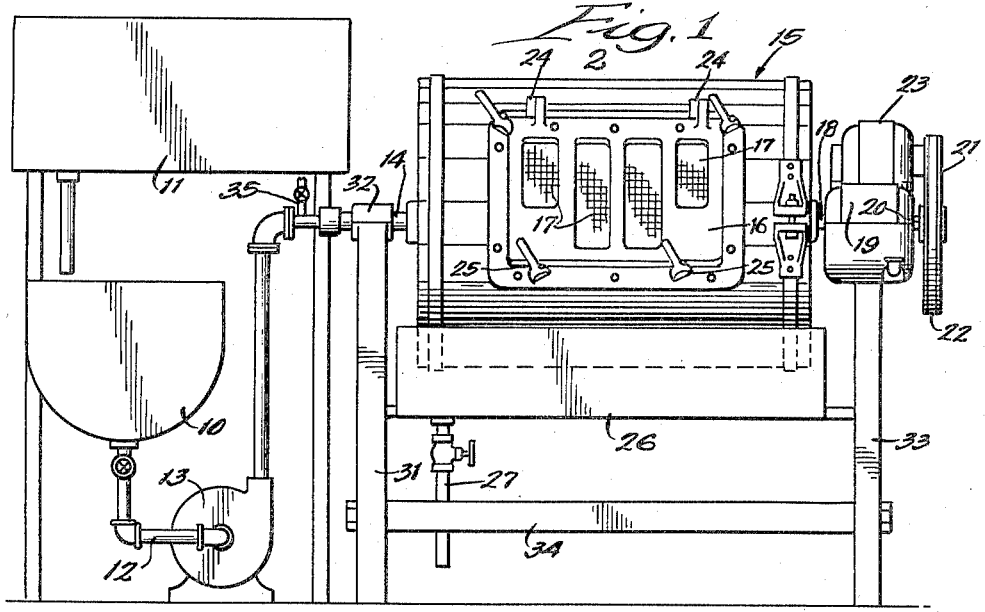
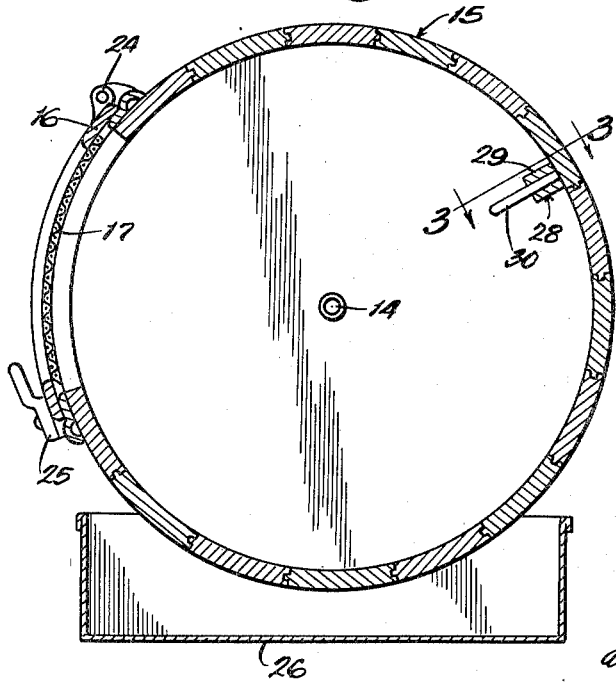
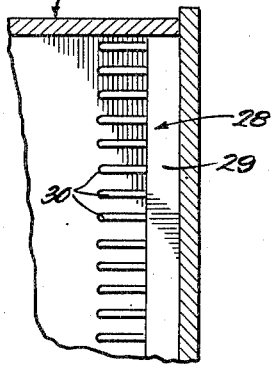

2,709,656

CHEESE MANUFACTURE

Donald M. Greer, Hinsdale, and John L. Zink, Chicago, Ill., assignors to Armour and Company, Chicago, Ill., a corporation of Illinois Original application December 9, 1947, Serial No. 790,628. Divided and this application March 3, 1951, Serial No. 213,722

1 Claim. (Cl. 99—116)

This invention relates to cheese manufacture. The invention embraces novel methods of cheese manufacture and novel apparatus.

This application constitutes a division of our copending application Serial No. 790,628 filed December 9, 1947, which has now matured into Patent No. 2,544,672.

In the manufacture of cheese, it is customary to treat the milk in vats to form a curd, to withdraw the whey to a substantial extent, and then to treat the curd as a mass in several steps involving hand operations. In such hand operations, the curd body is cut into pieces and the pieces piled or cheddared. Finally, the curd is milled, salted and hooped.

The above hand operations involve sanitation hazards, are expensive, and require considerable time and labor.

An object of the present invention is to provide a simple process in which the above hand operations are eliminated and in which more effective control is maintained over the various factors involved in cheese making. A still further object is to provide a new method and means of cheese manufacture in which a large volume of cheese can be produced from whey and curd without requiring any handling of the product manually. Yet another object is to provide apparatus in which the process is effectively carried on and which produces a product which may be readily placed in packages suitable for sale. A still further object is to provide simple and effective process steps, which may be employed in a variety of forms of apparatus and which produce a better quality cheese within a briefer period. Other specific objects and advantages will appear as the specification proceeds.

The invention herein may be practiced in connection with apparatus illustrated in the accompanying drawing, in which:

Fig. 1 is a front view in elevation of apparatus embodying our invention; Fig. 2, an enlarged transverse sectional view, the section being taken as indicated at line 2 of Fig. 1; and Fig. 3, a detailed sectional view, the section being taken as indicated at line 3 of Fig. 2.

In the illustration given, 10 designates a vat adapted to receive milk from any source, as, for example, from the tank 11 thereabove. In the vat 10, the curd is formed in the usual way, the curd at the time being in relatively small particles in the whey. The whey and curd are drawn through pipe 12 and pumped by pump 13 through a hollow trunion 14 into a rotatably mounted cylinder 15.

The cylinder 15 may be of any suitable structure. In the illustration given, the cylinder is provided with closed ends but the cylinder itself is provided with a door 16 having screens 17 extending thereacross. If desired, the door may be completely covered by screens or may be provided throughout with spaced perforations. Excellent results are also obtained when the entire body of the cylinder is provided with spaced perforations. Opposite the trunnion 14 is a shaft 18 secured to the cylinder 15 and the shaft 18 is journaled within the bearing member 19. The bearing member 19 is provided with speed reduction gears driven by shaft 20. Mounted upon shaft 20 is the pulley 21 which in turn is driven by a belt 22 connected to a pulley on the shaft of motor 23.

In the illustration given, the door 16 is secured to the cylindrical wall 15 by hinges 24 and pivotally mounted locking members 25 are provided for releasably locking the door 16 in place.

Below the cylindrical vessel 15 is supported a trough 26 equipped with a valved draw-off pipe 27. The pipe 27 may lead to any suitable point of storage for the whey.

Within the cylindrical vessel 15 on one side thereof is mounted a breaker device 28 adapted to break up large balls of cheese and to keep the material within the vessel in relatively small particles. In the specific illustration given, a beam 29 extends longitudinally of the cylindrical member 15 and is secured to the wall by glue, nails or any other suitable means. Rods 30 in spaced relation are embedded in the member 29 and extend freely therefrom into position for engaging masses of cheese or curd within the vessel.

The bearings for the trunnions 14 and 18 may be provided by any suitable apparatus. In the illustration given, the standard 31 supports a bearing 32 and the standard 33 supports the bearing member 19. A cross bar 34 connects the standards to form a suitable supporting frame.

*Operation*

In the operation of the process and apparatus, the usual cheese cook and curd forming operations are performed and the resulting curd and whey is drawn from the vat 10 through pump 13 and into the interior of the cylindrical vessel 15. It will be understood that, if desired, the curd may be simply transferred manually from a vat into the vessel 15 when the door 16 has been opened. We prefer, however, to pump the whey and the curd particles directly into the vessel 15.

Vessel 15 is rotated through the reduced gearing in the bearing casing 19. We have found that good results are obtained when the rotation is quite slow. By way of example, good results were obtained when the rotations were between 6 and 14 revolutions per hour. We have discovered that very good results are obtained when the rotation is intermittent. For example, the cylindrical vessel may be rotated for 2 minutes and then allowed to stand without moving for 4 minutes. In treating some types of cheese curd, it is found that the rotation may be continuous if the speed is extremely slow. We find that the speed of rotation will vary with different types of cheese curd being treated and under various other changes in operating conditions.

As the vessel 15 is rotated, the whey is very rapidly removed. For example, we find that more than 90% of the whey is removed in a very brief period and eventually more than 95% of free whey is removed from the curd or cheese body.

In the rotation of the curd and whey body, it is found that the curd builds up on the walls of the cylinder and is carried upwardly to a certain elevated position in which it folds over or breaks, the curd then falling into the lower portion of the vessel. As the curd breaks away from the screen 17, it has a suction effect which effectively cleans the screen and leaves the screen free for its function in the removal of whey.

The breaker apparatus 28 prevents the formation of large balls of curd which would otherwise make the effective removal of whey impossible and which would greatly reduce the uniformity of the final product. The breaker bars or rods 30 constantly strike the larger masses of the curd or cheese and break up such masses.

The whey drains from the smaller or broken masses and effective removal of whey is obtained. At the same time, it is found that the whey is obliged to drain through the mat of cheese or curd and in this manner, all the fat and other desirable parts of the whey are retained in the cheese, the escaping whey being substantially free of the materials which it is desired to retain in the body of the curd or cheese.

As the process continues, cheese body characteristics begin to develop in the material and a cheese product of excellent quality is produced. In this step of the process, it may be desirable to introduce an atmosphere other than air into the container and this may be effected through the hollow trunnion 14 by any suitable connections, as for example, through the valved pipe 35. Likewise, we can introduce into the container bacterial media of a suitable type to hasten curing.

After the desired cheese body characteristics have been fully developed, the cheese is removed. By reason of the broken up condition of the cheese, the material can be readily packed in packages suitable for final sale. If desired, the door 16 may be opened and the material within the vessel allowed to drop directly into such final packages supported in the trough 26 below the vessel 15. In this operation, a slight rotation of the cylinder 15 is effective in the mechanical removal of the material.

In the curd forming operation, the curd is kept in comminuted form by the operation of the usual agitator apparatus in curd forming vats so that after the formation of the curd the material may be readily pumped through pipe 12 and hollow trunnion 14 into vessel 15. By rapidly removing the whey by means of the perforated cylinder and then by continuously breaking up the masses or balls of curd, it is found that cheese body characteristics begin to develop much earlier than in prior processes with the result that the period of the cheese making operation is reduced and at the same time a better quality is obtained. Further, the product which is obtained may be more readily packed into containers for sale. In all of the operations described it will be noted that the material does not come into contact with the hands of the workman and the entire operation is accomplished mechanically. The curd and whey is pumped into a receptacle or machine which is so operated as to regulate the curd particle size, drainage and acidity development and finally, after the proper cheese body characteristics have been built up, the cheese may be removed mechanically and filled into hoops or packages. The apparatus further permits the treating of the curd in an aerated atmosphere or in an atmosphere of a selected gas so that the cheese is given a superior body and flavor.

In the above process the pumping of the curd and whey bodily from the vat to the rotating vessel protects the curd particles against being broken up, and the curd, when exposed within the vessel to the atmosphere and freed of the whey by the working of the curd, develops body characteristics within a greatly shortened period. As the curd is rotated or folded, the whey is continuously separated therefrom and withdrawn, leaving the curd in a condition for the rapid building up of cheese body characteristics.

While in the foregoing apparatus, specific details have been set out for the purpose of illustrating one embodiment of apparatus in which the process may be carried out and steps of the process have been described in detail for illustrating an embodiment thereof, it will be understood that the apparatus may be varied widely with respect to such structure and the process may be carried on in a variety of different forms of apparatus and with obvious modifications thereof without departing from the spirit of our invention.

We claim:

In a process for the preparation of cheese in which milk is treated to form the curd in whey, the steps of separating the curd from the bulk of the whey, slowly and continuously rotating the curd in a treating and draining zone open to the atmosphere to produce a folding and dropping of the curd, breaking up the curd into small particles during the rotation thereof, and draining the whey from the curd and from said treating zone during such slow rotation of the curd particles in said treating zone, whereby a dry cure of the curd particles is effected during rotation thereof, and finally withdrawing the treated curd from said zone.

References Cited in the file of this patent

UNITED STATES PATENTS

| | | |
|---|---|---|
| 1,475,398 | Kielsmeier | Nov. 27, 1923 |
| 1,650,625 | Hapgood | Nov. 29, 1927 |
| 2,544,672 | Greer et al. | Mar. 13, 1951 |